United States Patent [19]
Hofmann et al.

[11] Patent Number: 5,938,945
[45] Date of Patent: Aug. 17, 1999

[54] METHOD OF WELDING WELD STUDS TO A WORKPIECE

[75] Inventors: Jörg Hofmann, Giessen; Roland Kurz, Grossen-Linden; Klaus Schmitt, Giessen, all of Germany

[73] Assignee: Emhart Inc., Newark, Del.

[21] Appl. No.: 08/675,480

[22] Filed: Jul. 3, 1996

[30] Foreign Application Priority Data

Jul. 5, 1995 [DE] Germany .......................... 195 24 490

[51] Int. Cl.$^6$ .................................................. B23K 9/20
[52] U.S. Cl. ........................................................ 219/99
[58] Field of Search ...................................... 219/98, 99

[56] References Cited

U.S. PATENT DOCUMENTS

| 4,456,808 | 6/1984 | Wilkinson et al. . | |
| 4,650,957 | 3/1987 | Cullen et al. . | |
| 4,797,529 | 1/1989 | Schmitt et al. ............................ | 219/98 |
| 5,030,815 | 7/1991 | Glorioso . | |
| 5,070,226 | 12/1991 | Raycher et al. . | |
| 5,317,123 | 5/1994 | Ito .............................................. | 219/98 |
| 5,321,226 | 6/1994 | Raycher . | |
| 5,406,044 | 4/1995 | Killian et al. ............................ | 219/98 |

FOREIGN PATENT DOCUMENTS

| 4236526 | 5/1994 | Germany . |
| 96/10468 | 4/1996 | WIPO . |

*Primary Examiner*—Clifford C. Shaw
*Attorney, Agent, or Firm*—Edward D. Murphy

[57] ABSTRACT

The invention relates to a method of welding weld studs to a workpiece, in particular of aluminum in each case, by the stroke ignition method, in which the stroke height(s) of the weld stud (1) is altered as a function of the measured arc voltage and optionally of the arc firing time. In particular, the stroke height(s) of the stud (1) can be increased during the occurrence of short circuits, i.e. during a sudden drop in the arc voltage, preferably in predetermined steps. The weld stud is immersed into a pool of melt after a predetermined period of time of between 5 and 10 ms after the welding current has been switched off. The polarity of the stud or of the workpiece is changed at least once during the welding process. The welding current is interrupted for a predetermined period of time for this purpose. The method leads to an improved, readily reproducible quality of weld.

16 Claims, 2 Drawing Sheets

METHOD OF WELDING WELD STUDS TO A WORKPIECE

BACKGROUND OF THE INVENTION

The invention relates to a method of welding weld studs to a workpiece by the stroke ignition method.

The stoke ignition method is an arc welding method for studs for welding pin-shaped metallic parts to metal sheets and/or tubes. The advantage of this method resides in the short welding time which amounts to a few fractions of seconds. An economical method is thus provided, which is adopted in numerous spheres. With numerous welding tasks, it is necessary to ensure a high, reproducible quality of weld. This is important, in particular, in conjunction with the high degree of automation of the method. With the stroke ignition method, the stud is applied to the workpiece and is raised from the workpiece, forming an arc between the stud and the workpiece. After producing melted regions on the stud and on the workpiece, the stud is brought back to the workpiece, extinguishing the arc, is immersed into the pool of melt, pressed onto the metal sheet and held in its position until the melt has solidified. This entire procedure lasts milliseconds.

For producing melted regions on the stud and on the workpiece, the stroke height, in addition to current strength, welding time and arc voltage, is one of the most important variables which can be decisive for the quality of the weld. It has been discovered as a result of Research Project No. AIF4567 at the Welding Teaching and Experimental Establishment in Munich, which related to an attempt to reduce the susceptibility to defects during stud welding by stroke ignition, that very desirable fusion can be achieved with correct adjustment of the stroke. The stroke height is adjusted to a constant value, the optimum constant stroke height being dependent on the geometry of the weld stud.

In practice, the welding result is dependent not only on the stroke height but also on the disturbances occurring during welding, for example short circuits which occur due to droplet formation owing to the transition of the material into its molten state. The droplet size depends on the current strength and the stroke height. Owing to statistical variations in the droplets, these sometimes cause short circuits.

According to the invention this object is achieved by a method of welding weld studs to a workpiece, in particular aluminum weld studs to a workpiece made of aluminum, by the stroke ignition method, in which the stroke height of the weld stud is altered as a function of the measured arc voltage. It has been found that an alteration to the stroke height as a function of the arc voltage positively influences the welding result. The stroke height is altered as a direct function of the arc voltage. The procedure as such takes place in real time during the associated welding process. The method according to the invention is particularly suitable for compensating possible variations of the arc voltage with metallic materials in which, for example, the carbon content can vary. In particular, the specified method is suitable for welding aluminum studs to a workpiece made of aluminum.

The arc voltage indirectly reproduces the course of the welding process. It is therefore desirable to increase the stroke height of the stud during the occurrence of short circuits, i.e. during the sudden drop in the arc voltage, in order thus to reduce or eliminate the tendency to subsequent short circuits in the prevailing welding process.

The arc is also made longer by an increase in the stroke height. This takes place in small predetermined steps until no more short circuits occur. The alteration to the stroke height in predetermined steps can also be used to reduce the stroke height. An advantage here is that an undesirable increase in the arc voltage can be compensated, for example, by the combustion of the stud. The step width preferably lies between 0.1 and 0.8 mm, in particular between 0.2 and 0.5 mm.

According to a further advantageous idea, it is proposed that the stroke height be altered in such a way that the arc voltage is kept almost constant. Variations in the arc voltage which occur otherwise, for example due to different alloys in the stud, can thus be compensated and better welding results can therefore be achieved.

With the stroke ignition method, short circuits can occur during the welding process. The welding current circuit is short-circuited during a short-circuit and the welding current decreases markedly. As a result of the short-circuited welding current arc, no arc exists and the effective arc firing time is therefore reduced. It is therefore proposed that the necessary welding energy for the welding process be ensured in that, in particular, fixed short-circuit times correspondingly lengthen the predetermined welding time, the heat losses resulting from the short-circuit additionally being compensatable by lengthening the welding time over-proportionally to the short-circuit time. Although this measure increases the total duration of the processing, it is ensured that the necessary welding time, i.e. the time for which an arc exists, is attained and an adequate quantity of welding energy and heat is therefore introduced. Alternatively or in combination with this, the welding current can also be increased to compensate short-circuit times, but only to a limited extend because excessively high welding currents cause overheating of the welding pool, for example in the case of the material aluminum.

The welding energy is preferably introduced during the welding process in accordance with a set value curve dependent on the welding time. This has the advantage that reproducible welded joints can be created.

The welding process as such takes place within a very short period of time. The control for example by an actuator, by means of which the stroke height of the stud is altered, therefore has to be initiated relatively rapidly and adjusted accurately. The point at which the arc voltage occurs is therefore advantageously taken as a starting point for measuring the welding time. The independence between the welding time and possible idle times of the mechanism is therefore achieved. A problem of the stroke ignition method is the process of immersion of the stud into the melt. With rapid immersion of the stud into the melt, the melt sprays away, producing an unsatisfactory welded joint. Measures have been proposed for improving the welding results, as described, for example, in DE 32 15 453 A1. They are all intended for the monitoring and precise maintenance of the predetermined parameters by control measures, without allowing for the negative influences which change from weld to weld.

According to a further advantageous idea, it is proposed that the weld stud should not be immersed into the melt until the welding current has been switched off. This measure is particularly advantageous when welding aluminum weld stud is thus immersed into a pasty and not a watery pool of melt. Spraying is therefore considerably reduced. The switching off of the welding current prior to immersion of the weld stud into the melt also has the advantage that the penetration of the workpiece or stud is limited to the desired extent as, in contrast, for example to ferritic materials, the arc is not always extinguished immediately during immersion in the case of aluminum.

The weld stud immersion process preferably takes place within a predetermined period of time after the welding current has been switched off. The immersion process should take place with 20 ms, in particular within 5 to 10 ms, after the welding current has been switched off in order to give the thinly liquid pool of melt time to become pasty. This has the advantage that a clearly defined, constant and reproducible welding time can be predetermined and maintained, making welding time monitoring measures unnecessary.

It has been found, in particular in the case of aluminum, that the arc is very markedly constricted at the positive electrode. If the stud is anodically switched, high currents are required to achieve a fusing area of the same size as the head area of the stud. However, high currents can lead to over-heating which, in turn, can lead to an explosion of the joint region and therefore to the failure of the welding process. This drawback can be overcome if the polarity of the stud or of the workpiece is changed at least once during the welding process. Furthermore, uniform flat melting of the workpiece and of the stud is achieved due to the change of polarity, and breaking of the oxide skins on both sides is simplified.

To simplify the change of polarity, it is proposed that the welding current be reduced to a minimum value or be switched off completely for a predetermined period of time. The reduction of the welding current has the advantage that the arc is maintained during the change of polarity. It may also be desirable to interrupt the welding current for a few milliseconds without the need for aids to re-ignite the arc. The change of polarity in a short switched-off interval allows the use of inexpensive components (thyristors) whereas more complex electronics are required during a change of polarity from a high current level of different value without switching off.

Problems of over-heating can arise during the welding process. To avoid them, it is proposed according to a further advantageous idea that the welding current be increased continuously or step-wise. The welding current, preferably attains its maximum value just before the welding current is switched off. With the welding current, it should be borne in mind that it may be kept at its high level for a shorter period, the higher the welding current. The welding current is preferably increased in two, in particular three, stages. If the welding current is switched off and experiences a change of polarity during welding, a somewhat more complex stage shape may be advantageous, in which a very high current strength is predetermined just before the change of polarity and a switch back to maximum current strength takes place in two or more stages after the change of polarity.

A method of welding weld studs to a workpiece, in particular an aluminum weld stud to a workpiece made of aluminum, by the stroke ignition method is preferably carried out using an arc welding device comprising a movable stud holder and an actuator with a path measuring device, a weak current source which is electrically connected to the stud holder and a workpiece, and a controller for starting up the actuator and the welding current source, in which a measuring device measures the arc voltage and a signal corresponding to the arc voltage is transmitted to a first comparator which compares this signal to a predetermined threshold value and triggers the measurement of welding time when the threshold value is exceeded, and activates the controller, as a result of which an immersion process of the weld stud does not take place until the welding current has been switched off after a predetermined welding time, and transmits it to a second comparator which starts up the actuator and alters the stroke of the weld stud accordingly.

BRIEF DESCRIPTION OF THE DRAWINGS

Further advantages and features of the method of welding a stud to a workpiece by the stroke ignition method are described with reference to the drawings.

DESCRIPTION OF THE PREFERRED EMBODIMENT

Figure 1:
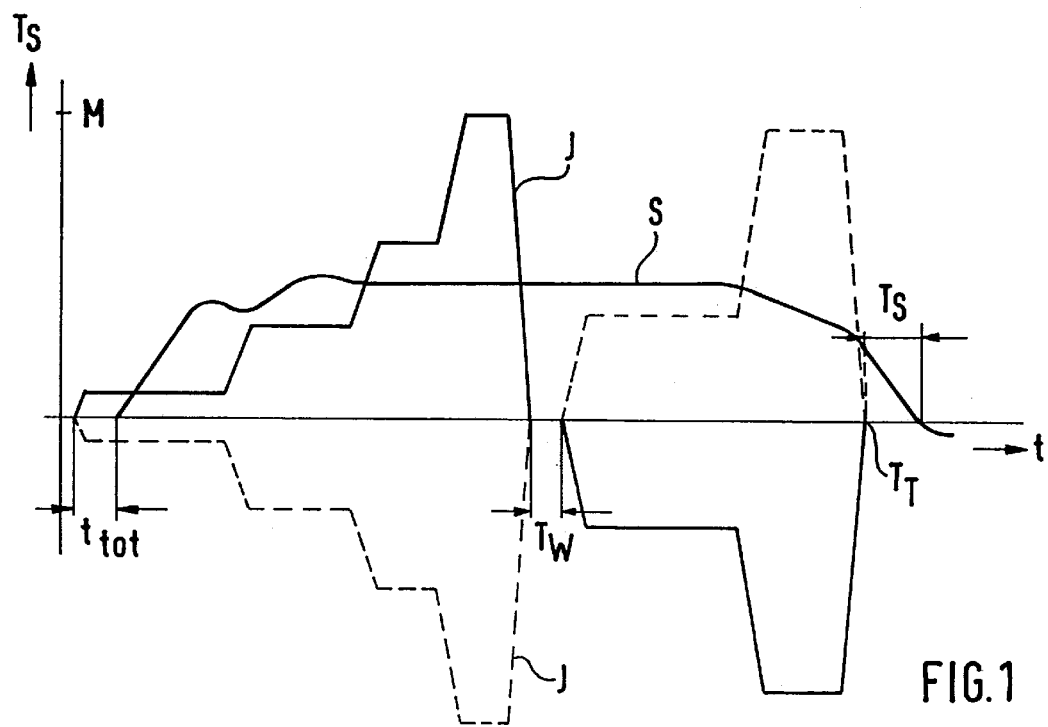
FIG. 1 shows schematically a graph of the welding current and stroke height as a function of time.

FIG. 1 shows the course of the welding current I over time t. As shown by the course of the current, the current strength increases stepwise to its maximum M. After a predetermined period of time, within which the welding current is switched on, there is a change of polarity in the weld stud or workpiece. To change the polarity of the welding current I, the polarity is switched off for a predetermined period of time $T_w$.

The conveyance of current over time is shown in broken lines, when the starting polarity is altered conversely to the conveyance of current shown by the solid line.

The stroke height s changes as a function of time during the welding process. A certain idle time $T_{tot}$ until the stud 1 has been lifted from the workpiece 2 by a relevant value s is formed when the welding current is switched on. As the current increases, the distance between the stud 1 and the workpiece 2 also increases. Toward the end of the welding process, the stroke height decreases until the immersion process is initiated at moment $T_T$. The welding current I is switched off at the moment of immersion. A predetermined period of time $T_s$ has elapsed between the immersion of the stud into the melt 3.

Figure 2A:
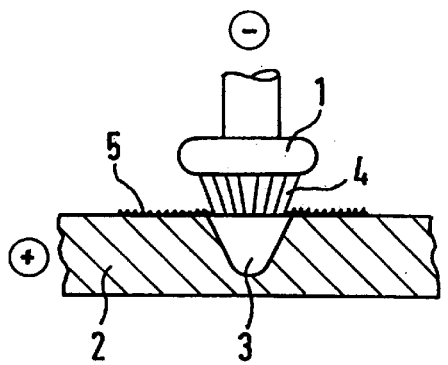
FIGS. 2a and 2b show schematically a workpiece and stud during a change of polarity.
Figure 2B:
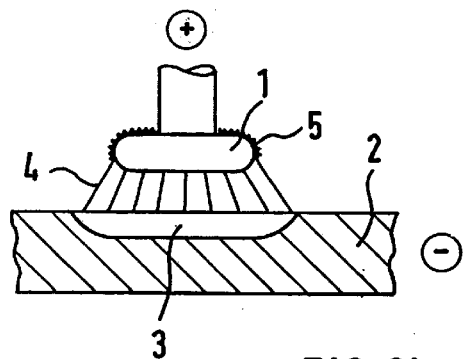

FIGS. 2a and 2b show schematically the influence of polarity on the formation of the pool of melt. In the case of aluminum, the arc 4 is very markedly constricted at the positive electrode forming the workpiece in FIG. 2a. Soot formation also occurs on the anode. The pool of melt 3 is enlarged as shown in FIG. 2b by a change of polarity whereby the workpiece becomes the cathode and the stud 1 the anode. The soot 5 now forms on the stud 1.

Figure 3:
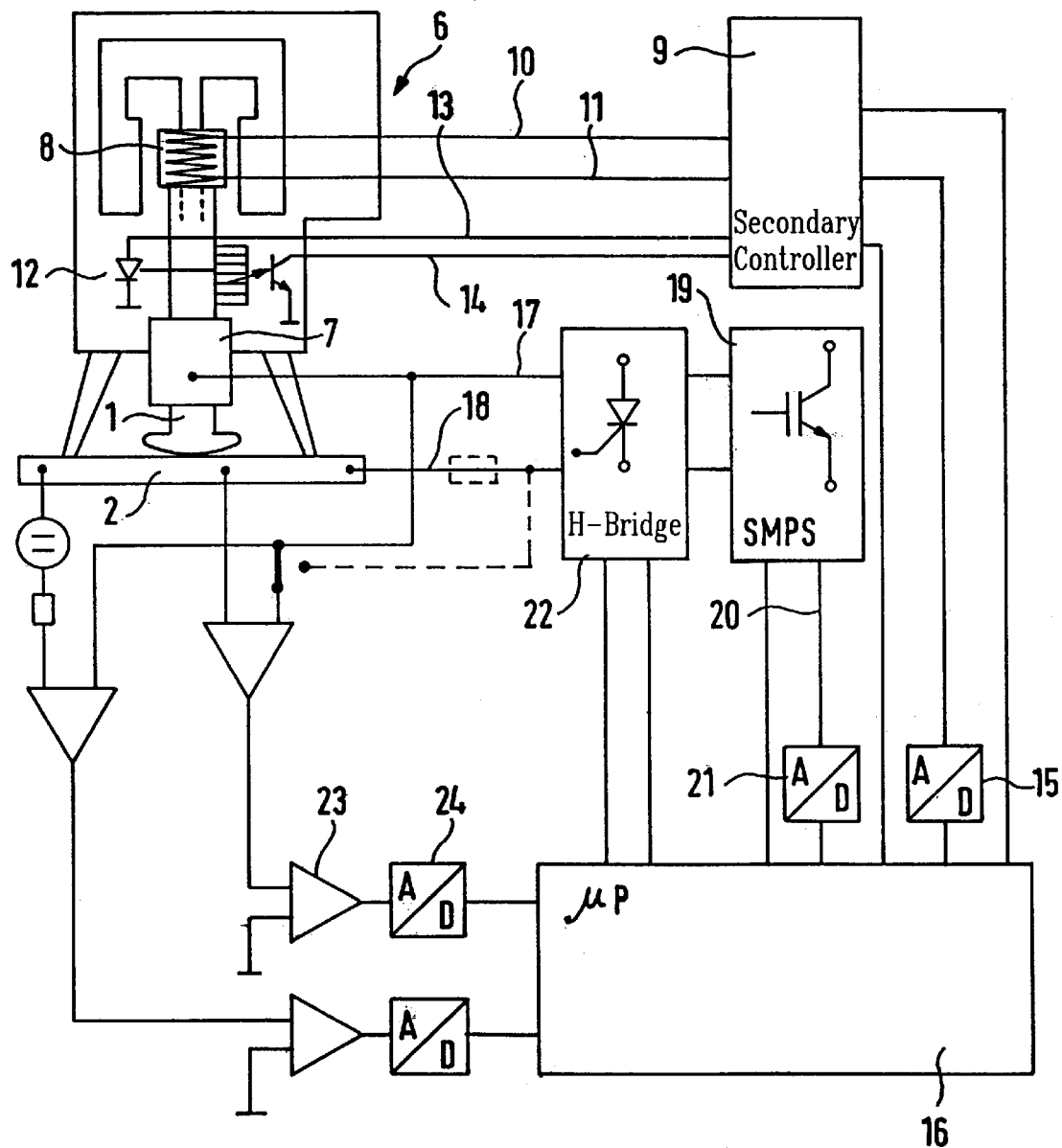
FIG. 3 shows schematically the circuitry of an arc welding device.

FIG. 3 shows schematically the circuitry of an arc welding device. The welding device 6 has a linear drive 8 which is connected to a stud holder 7. A suitable linear drive means in disclosed in U.S. Pat. No. 5,502,291. A stud 1 which rests on a workpiece 2 is held in the stud holder 7. A path measuring device 12 is also arranged between the linear drive 8 and the stud holder 7 in the welding device 6. The path measuring device 12 is connected via electric lines 13, 14 to a secondary controller 9. The linear drive 8 is also addressed via the electric lines by the secondary controller 9.

The linear motor 8, the secondary controller 9 and the path measuring device 12 are provided for appropriate height adjustment of the stud 1.

The secondary controller 9 is electrically connected to a microprocessor 16 via an analogue to digital converter 15.

During the welding operation, a welding current is conveyed via the lines 17, 18 from the switched-mode power supply 19 to the stud 1 and workpiece 2. The switched-mode power supply forms a controller welding current source. The switched-mode power supply 19 is connected via a line 20 to the microprocessor 16. The digital output signal from the microprocessor 16 is converted in the analogue to digital converter 21 arranged in the line 20 into an analog signal and is input into the switched-mode power supply. The switched-mode power supply 19 can be a high-frequency switched-mode power supply.

An H-bridge 22 made up from thyristors is arranged in the lines 19, 18 between the stud 1 and the workpiece 2 to change the polarity of the welding current. The bridge 22 is also connected to the microprocessor 16.

The set value comparator 23 is connected via an analogue to digital converter 24 to the programmable microprocessor 16 which transmits a corresponding control signal to the secondary controller 9 as a function of the arc voltage.

What is claimed:

1. A method of welding a stud to a workpiece comprising the steps of presenting a stud in close proximity to a workpiece;

creating an electric arc between said stud and said workpiece;

monitoring the voltage differential between said stud and said workpiece;

adjusting the space between said stud and said workpiece to maintain said voltage at a predetermined value;

maintaining said arc for a predetermined interval of time; and after the end of said time interval, plunging said stud into the molten surface of said workpiece.

2. A method of arc welding a stud to a workpiece comprising the steps of presenting a stud in close proximity to a workpiece;

creating an electric arc between said stud and said workpiece;

monitoring the voltage difference between said stud and said workpiece;

adjusting the distance between said stud and said workpiece as a function of said monitored voltage;

maintaining said arc between said stud and said workpiece for a period of time; and plunging said stud into the molten pool created on said workpiece by said arc.

3. A method of arc welding a stud to a workpiece comprising the steps of presenting a stud in close proximity to a workpiece;

creating an electric arc between said stud and said workpiece;

monitoring the voltage between said stud and said workpiece;

adjusting the distance between said stud and said workpiece so that said monitored voltage corresponds to a predetermined curve of voltage against time; and at the end of said curve, plunging said stud into the molten pool on said workpiece.

4. A method of arc welding a stud to a workpiece comprising the steps of presenting a stud to a workpiece in close proximity thereto;

creating a high energy electric arc therebetween;

maintaining said arc between said stud and said workpiece for a predetermined interval of time;

monitoring the voltage between said stud and said workpiece;

in the event that the voltage between said stud and said workpiece is reduced to zero, increasing the distance of the stud from the workpiece to reestablish a voltage differential therebetween; and at the end of said interval, plunging said stud into the molten pool on said workpiece.

5. A method as claimed in claim 4 wherein the distance of said stud from said workpiece is increased in incremental steps until said voltage differential is restored.

6. A method as claimed in claim 4 and further comprising the steps of measuring the duration of time during which said voltage differential is zero; and increasing said predetermined time interval by an amount at least equal to the time during which said voltage differential is zero.

7. A method as claimed in claim 6 wherein said predetermined interval is further increased by an additional amount sufficient to compensate for heat loss which occurs during the time said voltage differential is zero.

8. A method as claimed in claim 4 and including the steps of monitoring the total energy applied over time to said workpiece; and in the event of said voltage differential reaching zero, increasing at least one of said predetermined time interval and the current of said arc so that the total energy applied to said workpiece equals a predetermined value prior to said plunging step.

9. The method as claimed in claim 8 and including the step of adjusting both said time interval and said current so that the total energy equals said predetermined value.

10. A method of arc welding a stud to a workpiece comprising the steps of presenting a stud in close proximity to a workpiece;

creating and maintaining an electric arc between said stud and said workpiece;

reversing the relative polarity of said stud and said workpiece;

maintaining an arc for a period of time after said reversal to create a molten pool on said workpiece; and at the end of said time period, plunging said stud into said molten pool.

11. A method as claimed in claim 10 wherein the current flow in said arc is substantially reduced so as to minimize said arc at the moment of polarity reversal.

12. A method as claimed in claim 11 wherein the current in said arc is reduced to zero during at least the moment of polarity reversal.

13. A method as claimed in claim 10 and further comprising the steps of increasing the current in said arc in incremental amounts to a maximum value, thereupon reducing said current to minimize said arc while said step of polarity reversal is performed, and then increasing said current in incremental steps to a maximum value in the reverse direction.

14. A method of arc welding a stud to a workpiece comprising the steps of presenting a stud in close proximity to a workpiece;

creating an electric arc between said stud and said workpiece;

maintaining said arc for a period of time so as to create a pool of molten material on said workpiece;

terminating the current flow between said stud and said workpiece while said stud and said workpiece are spaced apart from each other; and thereafter plunging said stud into said molten material on said workpiece.

15. A method as claimed in claim 14 wherein said plunge step is performed within less than 20 milliseconds after termination of said current.

16. A method as claimed in claim 14 wherein said plunge step is performed at a time between five and ten milliseconds after termination of said current.

* * * * *